Patented Aug. 24, 1943

2,327,701

UNITED STATES PATENT OFFICE 2,327,701

PAINT AND VARNISH REMOVER COMPOSITION

Carleton Ellis, Montclair, N. J., Carleton Ellis, Jr. and Bertram Ellis and Bank of Montclair, executors of said Carleton Ellis, deceased, assignors to Chadeloid Chemical Company, a corporation of West Virginia No Drawing. Application March 28, 1940, Serial No. 326,386

10 Claims. (Cl. 252—169)

This invention relates to paint and varnish removers, particularly to those in which the liquid vehicle is composed of one or more organic solvents which volatilize or evaporate readily at ordinary temperatures. This invention also involves the use of agents which exert a modifying action on such remover compositions.

Paint and varnish removers for the most part consist of volatile solvents such as methyl or ethyl alcohol, acetone or methylethyl ketone, ethyl acetate or other low-boiling esters, benzene or toluene and the like. The term "ethyl acetate," as used in the appended claims is intended to include other esters which have boiling points not substantially higher than 77° C. Either an individual liquid or a mixture of two or more such liquids may be employed. In some instances it may be desirable to incorporate some higher-boiling liquid, such as tetrahydronaphthalene, the methyl or ethyl ether of glycol, or other similar fluid substances which also may exert a solvent or disintegrating action on the paint or varnish film undergoing treatment. In the above list of volatile solvents "ethyl acetate or other low-boiling esters" was intended to include such esters as have boiling points not considerably higher than that of ethyl acetate. And in the appended claims, "ethyl acetate" is intended to embrace such equivalents.

Such liquids, or mixtures thereof, when spread or brushed on painted or varnished surfaces although exerting a loosening or solvent action nevertheless evaporate, for the most part, so readily that the surface coatings are only incompletely disintegrated and therefore not easily removed by scraping gently with a knife blade, spatula, or other instrument, or in some other convenient manner. To overcome this feature of too rapid evaporation it is customary to incorporate in such composition a retardant of evaporation. Examples of such retardants are paraffin wax, montan or ceresin wax, crude scale wax, beeswax and the like. Any one of these waxy bodies or a mixture thereof may be employed. Usually the percentage of incorporated wax is relatively low, say 2 to 5 per cent.

When remover compositions containing such waxy bodies are spread or brushed on painted or varnished surfaces, then evaporation of a small proportion of the volatile liquid (or admixed liquids) results in the formation of a thin coating of wax over the remover composition. This coating of wax greatly reduces the rate of evaporation of liquid from the removed composition. The latter therefore remains in contact with the painted or varnished surface and effects solution and/or disintegration of the coating composition which afterwards can be easily removed in some convenient manner. This retardation of evaporation, of course, simultaneously reduces any fire hazard which may be associated with the employment of paint and varnish removers.

I have observed that incorporation of certain substituted paraffins, e. g., nitrated and halogenated paraffins, particularly those which are solid bodies at ordinary temperatures, either alone or as a substitute for part of the waxy materials, results in decreased rate of evaporation of the volatile liquid ingredients of remover compositions. In this specification, the term "solid substituted paraffins" means any nitrated or halogenated paraffin or mixture of said nitrated and/or halogenated paraffin which is solid at ordinary temperatures. If a large proportion of waxy materials is not detrimental to the purpose for which the remover composition is to be applied, then solid substituted paraffins alone may form the evaporation retarding agent. On the other hand, if it is desirable that only a small proportion of waxy bodies should be present in the remover as evaporation retardants, then a mixture of paraffin wax (or other appropriate wax) and solid substituted paraffins may be employed. In most cases the proportion of solid substituted paraffins can be less than that of the wax, or waxes, employed. In other words, the wax may form a major portion of the mixture and the solid substituted paraffins a minor proportion. If desired, however, the proportion of solid substituted paraffin hydrocarbons may be greater than that of the waxy material.

I have observed also that when paraffin wax, for example, is employed as the evaporation retardant in remover composition and evaporation of a small proportion of the volatile liquid ingredients has occurred, then the main body of the remover composition becomes covered with a thin layer of paraffin wax which greatly retards further evaporation of the liquid. This layer of wax, however, appears to be crystalline in character and brittle. Furthermore, when viewed closely the wax film seems to contain small minute openings through which continued evaporation of liquid slowly occurs. As the wax film increases in thickness these openings may become larger and eventually actual breaks in the film will be formed.

When solid substituted paraffins are incorporated in paint and varnish removers containing paraffin (or other) wax, or when such substituted paraffins are admixed with paraffin (or other) wax and the admixture incorporated into paint removers, then it has been observed that the wax film formed on the surface of a body of paint and varnish remover (when the latter is exposed to the atmosphere) is much less brittle, less crystalline in character, and contains less small minute openings through which evaporation of liquid may occur. In other words, the paraffin (or other) wax employed as an evaporation retardant when used in conjunction with solid substituted paraffins yields a plasticized film in which the substituted paraffins are the plasticizing agents. This unexpected plasticizing action of solid substituted paraffins also forms a part of my invention. It has been noted too, probably as a result of this plasticizing effect, that a mixture of solid substituted paraffins and wax exerts a greatly enhanced evaporation-retarding action in paint and varnish removers of the volatile solvent type either wax or solid substituted paraffins alone, when present in the same proportion as the mixture of wax and solid substitutel paraffins.

In some instances it is desirable that the viscosity of the paint and varnish remover be increased, thus preventing or substantially reducing its ready flow or easy spreading over the surface to which it is applied. Generally increased viscosity may be secured by dissolving a small proportion of a soluble cellulose compound (a cellulose ether, e. g., methyl ethyl or benzyl cellulose, or a cellulose ester, such as the nitrate or acetate) in the remover composition. I have noted that in such cases incorporation of solid substituted paraffins with the soluble cellulose derivatives in remover compositions containing volatile solvents imparts to such compositions evaporation-retarding properties greater than would be expected. This employment of solid substituted paraffins in conjunction with soluble cellulose derivatives is included in my invention. Furthermore, it has been observed that removers containing both cellulose derivatives and solid substituted paraffin bodies evaporate much more slowly than when either the retardant or thickener is used alone.

Substituted paraffin waxes being compatible with most organic solvents can be used in many types of removers. I find that solvents such as benzene, acetone, methyl alcohol, methylene chloride, carbon tetrachloride, tetrahydro-naphthalene or ethyl acetate may be used as paint remover solvents in conjunction with solid substituted paraffin as an evaporation retardant or with mixtures of a solid substituted paraffin and another wax or other waxes. Any mixture of the above solvents may be used but it is customary to employ at least one liquid capable of repressing the solubility of the wax or waxes present. When solvents such as methylene chloride, carbon tetrachloride or ethylene chloride are used with the solid substituted paraffins, non-inflammable paint and varnish removers may be made.

The so-called plasticizing ability of a solid substituted paraffin is effective over long periods of time. I have observed removers (containing in part or in whole a substituted paraffin retardant) that have been in contact with air in open evaporation dishes for as long as two weeks and the plasticizing effect of the substituted paraffin still existed, and very little of the solvent had evaporated. A remover not containing the solid substituted paraffin lost a majority of its solvent during the same time interval and the film of wax was translucent or crystalline in character.

A substituted paraffin wax that is solid at ordinary room temperatures and suitable for use in my invention may be made in the following manner. A solid paraffin wax melting at about 60° C. is treated with nitric acid at a temperature slightly above the melting point of the wax. If desired a catalyst, such as aluminum nitrate may be used. After the reaction is completed, the wax layer is separated from the acid layer. The waxy nitrated product is washed several times with hot water to remove any entrained acid or catalyst. Unreacted paraffin wax may be separated by employing acetone or any other suitable solvent in which the nitrated product is more soluble than the unreacted portion of the wax.

A chlorinated paraffin suitable for use in my invention may be made by the following method. A paraffin wax is heated above its melting point and chlorine gas bubbled through the molten wax. The composition of the product is controlled by stopping the chlorination when the weight of the paraffin wax has been increased by the proper amount.

Brominated or other halogenated solid paraffins suitable for use in this invention may be made in any convenient suitable manner. It is preferred, however, that the substituted paraffin be a solid at ordinary temperatures. In certain cases, the product may be a liquid at ordinary temperatures.

Other compounds employed in conjunction with the solid substituted paraffins are the same as those commonly used in paint and varnish removers.

My invention is applicable to any remover employing a waxy material as an evaporation retardant. As previously mentioned, I have observed that the substituted paraffin wax may be used in part or wholly as a substitute for the wax ordinarily used. If a mixture of waxes is used they may be admixed and dissolved in the liquid ingredients of the remover composition. In some cases the liquid ingredients may be heated and the wax dissolved therein. When the latter method is used enough wax is usually employed so that a precipitation of the wax occurs upon cooling the solution to room temperature. Any method incorporating the various ingredients may be used and the wax or waxes introduced whenever convenient, the essential point being that the finished product is saturated with at least one of the wax constitutents.

As mentioned above, the removers may be compounded with a thickener such as a cellulose derivative which helps retain the remover composition on vertical or slanting surfaces. Occasionally the removers are formulated to give a pasty product by employing a large excess of wax. Whatever may be the case, a film must be formed to retard evaporation and I have found by experiment that a solid substituted paraffin improves wax films by acting as a plasticizing agent and in so doing consequently forms a tougher and less pervious film that enhances retardation of evaporation.

The following examples will illustrate my invention, though I do not wish to be limited to these examples, the specific compounds used, the quantities prescribed or the methods employed, as all of these factors may be varied within wide limits.

*Example 1.*—A solid nitrated paraffin body was made in the following manner. Ten parts of the wax were admixed with 12.2 parts of hydrated aluminum nitrate (Al(NO₃)₃.9H₂O) as catalyst and 4.3 parts of nitric acid (sp. gr. 1.42) were added after heating the mixture to 100° C. The reaction mixture was maintained at 100° C. for 25 hours during which time it was stirred vigorously and at intervals of 6 hours there were added 4.3 parts, 4.3 parts and 2.1 parts, respectively, of nitric acid. At the end of the previously mentioned total time (25 hours), the waxy layer was separated from the aqueous layer. The nitrated wax was washed well with warm water and then extracted with acetone. Any insoluble matter was removed filtration and then the acetone evaporated. The product, a concentrated nitrated paraffin, was solid at room temperature.

*Example 2.*—A paint and varnish remover was made of the following composition:

| | Per cent |
|---|---|
| Acetone | 50 |
| Methylene chloride | 45 |
| Nitrated paraffin wax | 5 |

The nitrated wax as made in Example I was dissolved in the acetone and the methylene chloride added. This remover had a low evaporation rate and efficiently removed various paints and varnishes.

*Example 3.*—A paint and varnish remover having the following composition was made:

| | Per cent |
|---|---|
| Acetone | 47.5 |
| Benzene | 47.5 |
| Nitrated paraffin wax | 5 |

The solid nitrated paraffin as obtained in Example 1 was dissolved in the acetone and added to the benzene. When left in an evaporating dish in contact with air the wax formed a film on the remover that was very impervious and retarded evaporation excellently. The film was so transparent that it appeared non-existent until the surface was touched and then a wrinkling effect of the film was observed.

*Example 4.*—A remover containing 4 per cent paraffin wax and 1 per cent nitrated paraffin wax in a solvent composed of equal parts of acetone and benzene was made. The paraffin wax was dissolved in the benzene and the nitrated paraffin in acetone and then the two solutions mixed. The remover composition contained some undissolved paraffin wax. The film on the evaporating remover appeared to be more transparent than when only paraffin wax was used in the same mixed solvent.

*Example 5.*—A remover was compounded which contained 4 per cent nitrated paraffin wax (from Example 1) and 1 per cent paraffin wax in a solvent consisting of equal volumes of acetone and benzene. The paraffin wax was dissolved in the benzene and the nitrated compound in acetone. The two solutions were mixed and the resulting product, when allowed to evaporate, produced a film that was very transparent. This remover composition, when placed in an evaporating dish and exposed to the atmosphere for two weeks lost much less solvent than did the composition as made in Example 4 under the same conditions. Comparison of the waxy film in each instance indicated that the latter composition (from Example 4) gave a thick, rough, crystalline film which was not transparent and the film from the composition containing nitrated hydrocarbons was tough, smooth and transparent. The plasticizing effect of the nitrated hydrocarbons thus was demonstrated clearly.

*Example 6.*—A remover was made containing only benzene as a solvent and the retardant composed of 4 per cent montan wax and 1 per cent nitrated paraffin wax. The film formed during evaporation of the solvent was clear and retarded evaporation better than when montan wax was employed alone.

*Example 7.*—A paint and varnish remover (analogous to that described in Example 6) was made by substituting ceresin wax for montan wax. The latter mixture exhibited properties and comparisons much like those given for the montan wax removers.

*Example 8.*—Two mixtures were made containing nitrocellulose. Acetone was used as a solvent and 5 per cent nitrocellulose dissolved therein. In one of the solutions 3 per cent (based on weight of solution) of a solid nitrated paraffin was dissolved. The evaporation rate of the solution containing the wax was much slower than the straight nitrocellulose solution. Also, the wax-cellulose derivative solution lost solvent more slowly than a corresponding wax solution not containing a cellulose derivative.

*Example 9.*—Chlorinated paraffin wax was made by the following method. Paraffin wax melting at 50–55° C. was heated to 70° C. Chlorine gas was bubbled through the molten wax until the weight of the wax had increased to such a point that the chlorine content was 10 per cent of the product. Hydrogen chloride formed was removed by washing the chlorinated wax with warm water. The temperature of the wash water should be substantially above the melting point of the chlorinated wax product.

*Example 10.*—A paint and varnish remover was made as follows. In a mixture of equal parts by weight of benzene and acetone, 5 per cent by weight of chlorinated wax, as made in Example 9, was dissolved. This composition removed paint very well.

*Example 11.*—A paint and varnish remover was made in the following manner. The solvent was composed of equal weights of acetone and benzene. Four per cent paraffin wax and 1 per cent chlorinated wax, as made in Example 9, were mixed with the solvent. The paraffin wax was not completely soluble. This remover had properties similar to those of the remover in Example 4.

*Example 12.*—A non-inflammable paint and varnish remover is made in the following manner. Nitrated paraffin wax, as made in Example 1, is dissolved in a mixture of methylene chloride and carbon tetrachloride and tetralin is added to the solution. The proportions of ingredients are as follows:

| | Parts |
|---|---|
| Methylene chloride | 55 |
| Carbon tetrachloride | 13 |
| Tetrahydro-naphthalene | 27 |
| Nitrated paraffin wax | 5 |

It is seen from the foregoing disclosures that my invention provides paint and varnish removers that have an improved quality. It involves the use of solid substituted paraffins as retardants of evaporation of the volatile components of the removers. These substituted paraffins are solids at ordinary temperatures and may be used alone or partly to replace waxes commonly employed in paint removers as evaporation retardants. In ordinary practice 1 to 5 per cent total waxes is enough to retard evaporation to the desired degree. These proportions are neither the maximum nor minimum, as greater or lesser quantities of wax may be employed in special cases.

The quality of the paint and varnish removers is improved when solid substituted paraffin hydrocarbons are incorporated therein. This improvement comprises decreasing the evaporation rate of the removers and thereby allowing the liquid ingredients more time to act on the surface to be cleaned. Furthermore, when solid substituted paraffins are present the film formed on the surface of a remover composition (due to partial evaporation of liquid ingredients therein) is tougher, thinner, more transparent and less pervious than when waxes alone are used. Only small amounts of the solid substituted paraffin may be necessary to give an improved film when used in conjunction with other waxes.

Although my invention has been illustrated with paraffin wax and the nitration and chlorination thereof, I do not wish to be limited to those particular paraffins or aliphatic hydrocarbons. Other materials which may serve equally well include crude scale wax, sweater oil, or even high-boiling or heavy, viscous liquid paraffins which yield solid substituted derivatives. Such substitutes for paraffin wax are, in all cases, hydrocarbons which are either solids at room temperature or are viscous liquids at room temperature, and they are all non-volatile, except at high temperature. Neither do I wish to be limited to those substituted paraffins which contain only one substitution group or radical, since compounds containing one, two or three nitro groups, or mixtures of such compounds, are equally applicable. What I do wish to avoid is the employment of those paraffinic or aliphatic hydrocarbons which possess such relatively low molecular weights that introduction of one or more nitro groups per molecule (of hydrocarbon) will give rise to the formation of an explosive or otherwise unstable product.

The liquid ingredients or solvents which are suitable for my purpose include those organic compounds which are normally liquid at atmospheric pressure and ordinary or room temperatures but which vaporize or evaporate readily at room temperature. By the term solvent I mean not only an individual substance but also a mixture of two or more liquids which are mutually soluble one in the other and which do not interact chemically when admixed. Preferably such liquids are anhydrous or substantially so, since the presence of an appreciable proportion of water may prevent formation of a homogeneous liquid phase or may exert some other undesirable effect.

In the foregoing specification where I have used acetone it is understood that various acetone substitutes, e. g., the product known as methyl acetone (i. e. methyl ethyl ketone), may be used. When methyl acetone is mixed with about an equal part of a good grade of benzene (benzol) the resulting mixture is slightly more active as a softening agent than acetone alone, or acetone mixed with about an equal amount of benzol.

What I claim is:

1. A finish remover composition, substantially devoid of suspended inorganic substances insoluble therein, and adapted for softening old paint and varnish film preparatory to removal thereof, which remover comprises at least one volatile solvent selected from the group consisting of benzene, toluene, acetone, methyl ethyl ketone, methylene chloride, ethylene chloride, carbon tetrachloride, methyl alcohol, ethyl alcohol and ethyl acetote; and a solid substituted paraffin selected from the group consisting of solid nitrated paraffin wax and solid halogenated paraffin wax, solid nitrated scale wax, solid halogenated scale wax, solid nitrated sweater oil, solid halogenated sweater oil, solid nitrated heavy viscous liquid paraffin and solid halogenated heavy viscous liquid paraffins, the proportion of said solid substituted paraffin being not substantially less than 1% and being sufficient to form an evaporation-retarding film on the surface of said composition on exposure to the atmosphere, whereby further evaporation of the volatile solvent is retarded.

2. A finish remover composition, substantially devoid of suspended inorganic substances insoluble therein, and adapted for softening old paint and varnish film preparatory to removal thereof, which remover comprises at least one volatile solvent selected from the group consisting of benzene, toluene, acetone, methyl ethyl ketone, methylene chloride, ethylene chloride, carbon tetrachloride, methyl alcohol, ethyl alcohol and ethyl acetate; and a solid nitrated paraffin wax, the proportion of said nitrated paraffin wax being not substantially less than 1% and being sufficient to form an evaporation-retarding film on the surface of said composition on exposure to the atmosphere, whereby further evaporation of the volatile solvent is retarded.

3. A finish remover composition substantially devoid of suspended inorganic substances insoluble therein, and adapted for softening old paint and varnish film preparatory to removal thereof, which remover comprises at least one volatile solvent selected from the group consisting of benzene, toluene, acetone, methyl ethyl ketone, methylene chloride, ethylene chloride, carbon tetrachloride, methyl alcohol, ethyl alcohol and ethyl acetate; and a solid halogenated paraffin wax; the proportion of such halogenated paraffin wax being not substantially less than 1%, and being sufficient to form an evaporation-regarding film on the surface of said composition on exposure to the atmosphere, whereby further evaporation of the volatile solvent is retarded.

4. A finish remover composition substantially devoid of suspended, inorganic substances insoluble therein and adapted for softening old paint and varnish films preparatory to their removal, which remover contains a composite solvent which includes a volatile solvent selected from the group consisting of benzene, toluene, acetone, methyl ethyl ketone, methylene chloride, ethylene chloride, carbon tetrachloride, ethyl alcohol, methyl alcohol and ethyl acetate; and which solvent also includes a higher-boiling substance selected from the group consisting of tetrahydro-naphthalene and methyl and ethyl ethers of glycol, said remover also containing a solid substituted paraffin selected from the group consisting of solid nitrated paraffin wax, solid halogenated paraffin wax, solid nitrated scale wax, solid halogenated scale wax, solid nitrated sweater oil, solid halogenated sweater oil, solid nitrated heavy viscous liquid paraffins, and solid halogenated heavy viscous liquid paraffins, the proportions of said solid substituted paraffin being not less than about 1% and being sufficient to form a film on the surface of said composition by partial evaporation of said volatile solvent from said composition on exposure to the atmosphere, whereby further evaporation of said volatile solvent mixture is retarded.

5. A finish remover substantially devoid of suspended, inorganic substances insoluble therein and adapted for softening old paint and varnish films preparatory to their removal which comprises a solvent mixture which includes at least one volatile solvent selected from the group consisting of benzene, toluene, acetone, methyl ethyl ketone, methylene chloride, ethylene chloride, carbon tetrachloride, methyl alcohol, ethyl alcohol and ethyl acetate; and which solvent includes a higher boiling solvent selected from the group consisting of tetrahydro-naphthalene and methyl and ethyl ethers of glycol, said remover containing also an admixture of a waxy body selected from the group consisting of paraffin wax, montan wax, ceresin wax, crude scale wax and beeswax, together with a solid substituted paraffin selected from the group consisting of solid nitrated paraffin wax, solid halogenated paraffin wax, solid nitrated scale wax, solid halogenated scale wax, solid nitrated sweater oil, solid halogenated sweater oil, solid nitrated heavy viscous liquid paraffins and solid halogenated heavy viscous liquid paraffins, the total proportion of said waxy body and said solid substituted paraffin being not less than about 1% but sufficient to form a film on the surface of said composition by partial evaporation of solvent from said composition on exposure to the atmosphere, whereby further evaporation of said solvent mixture from said composition is retarded, and the proportion of said solid substituted paraffin being sufficient to plasticize the waxy body in the film formed on partial evaporation of solvent from said composition.

6. A finish remover according to claim 5, in which the total proportion of said waxy body and solid substituted paraffin is not more than about 5% and not less than about 1%.

7. A finish remover according to claim 5, in which the proportion of said waxy body is in excess of that of solid substituted paraffin.

8. A finish remover according to claim 5, in which the proportion of solid substituted paraffin is in excess of that of said waxy body.

9. A finish remover according to claim 1, also containing a cellulose thickening agent soluble therein and selected from the group consisting of cellulose esters and cellulose ether.

10. A finish remover composition adapted to soften old coats of paint and varnish preparatory to removal thereof, of the type containing a volatile organic liquid solvent for said old coats and an evaporation retarding film forming wax, such composition being substantially devoid of suspended inorganic substances insoluble therein, such composition containing a chemically unmodified waxy body selected from the group consisting of paraffin wax, montan wax, ceresin wax, crude scale wax and beeswax; and a solid substituted paraffin selected from the group consisting of solid nitrated paraffin wax, solid halogenated paraffin wax, solid nitrated scale wax, solid halogenated scale wax, solid nitrated sweater oil, solid halogenated sweater oil, solid nitrated heavy viscous liquid paraffins and solid halogenated heavy viscous liquid paraffins; the total combined amounts of said waxy body and said solid substituted paraffin being from 1% to 5% of said composition, and the amount of said solid substituted paraffin being enough to plasticize the said waxy body contained in the evaporation retarding film formed from a layer of said remover composition when applied to a surface from which the old coat is to be removed.

CARLETON ELLIS.